(12) United States Patent
Schumann et al.

(10) Patent No.: US 9,684,068 B2
(45) Date of Patent: Jun. 20, 2017

(54) METHODS FOR DETECTING SENSOR DEGRADATION IN DISTANCE SENSORS (71) Applicant: Robert Bosch GmbH, Stuttgart (DE)

(72) Inventors: Michael Schumann, Stuttgart (DE); Andras Roka, Budapest (HU)

(73) Assignee: ROBERT BOSCH GMBH, Stuttgart (DE)

( * ) Notice: Subject to any disclaimer, the term of this patent is extended or adjusted under 35 U.S.C. 154(b) by 106 days.

(21) Appl. No.: 14/440,774

(22) PCT Filed: Sep. 24, 2013

(86) PCT No.: PCT/EP2013/069808
§ 371 (c)(1),
(2) Date: May 5, 2015

(87) PCT Pub. No.: WO2014/072118
PCT Pub. Date: May 15, 2014

(65) Prior Publication Data
US 2015/0260833 A1 Sep. 17, 2015

(30) Foreign Application Priority Data
Nov. 8, 2012 (DE) .......... 10 2012 220 311

(51) Int. Cl.
G01S 7/52 (2006.01)
G01S 15/88 (2006.01)
G01S 15/93 (2006.01)
G01S 15/87 (2006.01)

(52) U.S. Cl.
CPC .......... *G01S 7/52004* (2013.01); *G01S 15/87* (2013.01); *G01S 15/88* (2013.01); *G01S 15/931* (2013.01); *G01S 2007/52009* (2013.01)

(58) Field of Classification Search
CPC .... G01S 15/931; G01S 7/52004; G01S 15/87; G01S 15/88; G01S 2007/52009
See application file for complete search history.

(56) References Cited

U.S. PATENT DOCUMENTS

2010/0329080 A1* 12/2010 Frank .................... G01S 15/931
367/99
2015/0260833 A1* 9/2015 Schumann ............ G01S 15/931
367/13

FOREIGN PATENT DOCUMENTS

| DE | 10 103 936 | 1/2002 |
| DE | 10 2007 059908 | 6/2009 |
| DE | 10 2009 040992 | 3/2011 |
| EP | 0 816 865 | 1/1998 |

* cited by examiner

Primary Examiner — Daniel Pihulic
(74) Attorney, Agent, or Firm — Gerard Messina (57) ABSTRACT A method for detecting a sensor degradation in distance sensors, having the following: a) sending out at least one transmit pulse; b) acquisition of a sensor signal at least in a decay interval; and c) determination of a degree of degradation based on a frequency response of the acquired sensor signal. Also described is a computer program product, a distance sensor unit, and a driver assistance system for carrying out such methods.

13 Claims, 5 Drawing Sheets

METHODS FOR DETECTING SENSOR DEGRADATION IN DISTANCE SENSORS

FIELD OF INVENTION

The present invention relates to a method for detecting sensor degradation in distance sensors. The present invention further relates to a distance sensor unit, a driver assistance system, and a computer program for carrying out the method.

BACKGROUND INFORMATION

Driver assistance systems are auxiliary devices in a vehicle that support the driver when driving the vehicle. Such driver assistance systems typically include various subsystems such as driver information systems or predictive safety systems. Some of these subsystems require an environmental sensor system that monitors the surrounding environment of the vehicle in order for example to detect objects that may present obstacles on the roadway.

Typical methods for environmental recognition in a vehicle make use of distance sensors, in particular ultrasound sensors, that, based on a transmission pulse echo method, measure the distance from objects in the environment surrounding the vehicle, and whose measurement data are used as a basis for a reaction that is to be generated by the driver assistance system. The quality of the provided measurement data therefore plays a decisive role in the provision of a driver assistance function. Thus, sensor degradations or environmental influences such as snow or ice may cause disturbances that result in the complete loss of function of the ultrasound sensors. The ultrasound sensors are then quasi-blind. In order to make diagnoses of the functioning of the ultrasound sensors that are as reliable as possible, various methods are known.

In the simplest case, the functioning of the ultrasound sensor is measured by measuring whether the sensor is detecting a signal at all. From DE 10 103 936 A1, an ultrasound sonar system is known for detecting an obstacle, in which an ultrasound oscillator produces a post-oscillation or decay oscillation frequency. By changing from a first transmission frequency to a second transmission frequency different from the post-oscillation frequency, the presence of an echo, and thus of an obstacle, within a specified distance can be inferred. However, such methods cannot provide a reliable assessment of whether the sensor is impaired or nonfunctional.

A second group of methods measures a transfer function at various excitation frequencies, and is capable of extracting information therefrom concerning the frequency characteristic and the signal quality. DE 10 2010 003 624 A1 describes a method for acquiring disturbances of an ultrasound transducer. The ultrasound transducer is excited with two different frequencies, and the resulting different release time durations are compared. However, the measurement, which is a function of frequency, requires a good deal of time, and during this time the sensor cannot be used for other purposes. In addition, additional electronics are required that make the configuration of the sensor more complex and more expensive.

The third group of methods makes use of the die-out characteristic of the sensor in order to monitor its functionality. From EP 0 816 865 A2, a method is discussed for self-testing a device for ultrasound runtime measurements, in which the die-out characteristic of the ultrasound sensor is evaluated after a transmission process. In "diagnostic" mode, the die-out characteristic is evaluated with regard to at least one signal shape parameter, and is monitored to check the observance of an error criterion. Here, the die-out characteristic can be measured with each send-receive cycle. However, it is difficult to make reliable assessments of the functionality of the sensor on the basis of the die-out characteristic.

A further disadvantage of the known methods is that a total failure of ultrasound sensors is difficult to recognize. In particular when used in driver assistance systems, such a total failure means that the system is at least partially "blind." Therefore, there is an ongoing interest in reliably recognizing possible disturbances, in particular those that result in complete loss of functionality.

SUMMARY OF THE INVENTION

According to the present invention, a method is proposed for detecting a sensor degradation in distance sensors, including the following steps:
a) sending out at least one transmit pulse;
b) acquiring a sensor signal at least in a decay interval; and
c) determining a degree of degradation based on a frequency response of the acquired sensor signal.

The distance sensor can be part of the environmental sensor system of a driver assistance system having various subsystems, for example having a parking assistant, a side monitoring assistant, or a lane departure warning system. The environmental sensor system of the driver assistance system is used to monitor the environment around the vehicle, using for example ultrasound sensors, radar sensors, infrared sensors, lidar sensors, optical sensors, or combinations thereof as environmental sensors. For the distance measurement, in particular those sensors are used that determine the distance from objects in the environment around the vehicle using a pulse-echo method. Ultrasound sensors may be suitable for this.

In the context of the present invention, the distance sensor can both send out a transmit pulse and also receive an echo. However, this configuration is advantageously in no way compulsory. It is equally possible for the transmitter and receiver to be made separate. In the case of separate units, at least two distance sensors are used, one distance sensor acting as "transmitter" when it emits a transmit pulse, and one distance sensor acting as "receiver" when it receives a signal.

The method according to the present invention can be carried out in the context of a runtime measurement that is carried out with the aid of at least one distance sensor. The distance sensor is first controlled to send out a transmit pulse having a transmit pulse length. The controlling can take place in a driver assistance system, for example being accomplished centrally by a control device (electronic control unit, ECU), or by an electronics device assigned to the distance sensor, such as an application-specific integrated circuit (ASIC). Here, the sensor parameters, such as the transmit current, the frequency, the amplitude, the transmit pulse length, or the modulation of a transmit pulse or of successive transmit pulses, can be variable and can be adapted to the respective situation. The transmit interval is followed by a decay interval in which for example a membrane of the distance sensor post-oscillates. Subsequently, the sent-out transmit pulses are detected by one or more distance sensors as echo signals when reflected by objects. From the runtime of a transmit pulse, i.e. the time between the sending out of the transmit pulse and the reception of the echo signal, the distance between the object and the distance sensor then results, taking into account the speed of the signal and possibly the speed of the vehicle.

In an implementation of the method according to the present invention, the sensor signal is acquired in each decay interval that follows the transmit interval. The decay interval may be followed by a receive interval in which echo signals are received before a subsequent transmit pulse is sent out. The sensor signal may be acquired in a decay interval and in a transmit interval.

In a further implementation of the method according to the present invention, the frequency response of the sensor signal is determined from intervals of at least a quarter wavelength. The frequency response may be determined from intervals of a half wavelength.

The frequency response of the acquired sensor signal in the decay interval can include at least three intervals, a first and a third interval containing at least one extremum, and the second interval being situated between the last extremum of the first interval and the first extremum of the third interval.

The degree of degradation may be determined on the basis of the frequency response in the second interval. A mean value can be determined from the frequency response in the second interval, and the degree of degradation can be determined from the mean value and a specified target value. The target value can for example correspond to the inherent frequency of the distance sensor in a fully functional state.

In a further implementation of the method according to the present invention, the degree of degradation can result from the envelope of the frequency response. The envelope of the frequency response can be determined for this purpose and can be compared to a specified curve, in particular to the curve of a fully functional distance sensor. The specified curve can be stored in the electronics device allocated to the distance sensor, or can be stored in a central control device. The difference between the curve of the frequency response and the specified curve can be determined and characterized using standard methods such as mean deviation. Due to the simplicity of the method, this can be realized as hardware circuitry, for example as circuitry having comparators and counters, or as software in the electronics device allocated to the distance sensor or to the central control device.

Objects in the near field can generate echoes that interfere with the frequency response in the decay interval, so that in this way differences also result from the "normal" frequency response, and there is the false appearance of a degradation. In a further implementation of the method according to the present invention, in an additional step the degree of degradation is therefore validated by a variation of the transmit pulse length, which may be a transmit pulse length that is made longer relative to the normal operation of the distance sensor. Through the modified transmit pulse length, a near field echo interferes with the frequency response in the decay interval at a different point in time. This also results in different frequency curves. If the frequency response in the decay interval remains independent of the transmit pulse duration, then the distance sensor is blind.

A further quantity that can be used to provide assistance here is the decay time itself. In particular in the case of longer transmit pulse durations (and thus also echo durations), the decay time will significantly increase. If, in contrast, the decay time remains the same independent of the transmit pulse length, then it can be assumed that no objects are situated in the near field. In a further implementation of the method according to the present invention, additional echo signals are therefore recognized in the decay interval based on a decay time. For this purpose, the transmit pulse length can be selected to be longer than the decay time, or a modification of the echo signal can be used as a basis. If the decay time is the same in both variants, then the distance sensor is blind.

According to the present invention, in addition a computer program is proposed for carrying out one of the methods described herein when the computer program is run on a programmable device. The computer program can be stored on a machine-readable storage medium, such as a permanent or rewritable storage medium, or in allocation to a computer device, or on a removable CD-ROM, DVD, or USB stick. In addition or alternatively, the computer program can be provided on a computer device such as a server for downloading, e.g. via a data network such as the Internet or cloud, or via a communication connection such as a wireless connection.

According to the present invention, in addition a distance sensor unit is proposed having a receive unit that is fashioned to carry out the method described above. The subject matter of the present invention also includes a driver assistance system for carrying out the method described above, having the following components:
  i) at least one distance sensor for sending out at least one transmit pulse;
  ii) at least one component, in particular a receive unit, for acquiring a sensor signal in at least one decay interval; and
  iii) at least one component for determining a degree of degradation based on a frequency response of the acquired sensor signal.

In addition, the distance sensor unit according to the present invention and the driver assistance system according to the present invention can include a component that validates the degree of degradation through a variation of the transmit pulse length, which may be a transmit pulse length that is made longer relative to the normal operation of the distance sensor.

Here, the individual components represent functional components or routines that are executed for example in the context of a computer program on an electronic device such as a programmable computer device. The computer device can for example be a control device (ECU) for implementing a driver assistance system, or a subsystem thereof, or can be electronic devices (ASIC) allocated to the distance sensors. In this way, in particular the receive unit can be fashioned as a central control device or as a receive unit allocated to the distance sensors.

The electronic device can communicate with the distance sensor via control signals, as a central device or as a sensor-individual device. Thus, control signals can be generated that trigger the distance sensor to send out transmit pulses having a defined transmit spectrum. Conversely, the distance sensor can forward received signals to the electronic device for signal processing. In this way, the determination of the degree of degradation takes place in the context of the signal processing.

The present invention makes it possible to reliably monitor the functional capacity of a distance sensor. In particular on the basis of the frequency response in the decay interval, a reliable assessment can be made concerning the degree of degradation of the distance sensor. From this it results whether the distance sensor is fully functional, partially blind, or completely blind. Such a monitoring is advantageous in particular for distance sensors in a driver assistance system, because in this way incorrect assessments and false reactions due to blind distance sensors are avoided.

The determination of the degree of degradation is accomplished through a simple measurement that can be carried out in each transmit-receive cycle without influencing the functionality of the distance sensor. In addition, the signal curve in the decay interval provides a very stable signal that in turn increases the reliability of the method according to the present invention. In addition, simple monitoring mechanisms can be integrated into the method according to the present invention that avoid possible misclassifications of a distance sensor.

It is also the case that no special requirements have to be made of the electronic components in order to realize a unit for determining the degree of degradation, and already-existing receive units can be used. In particular, the method can be realized very economically in the distance sensor, because only comparators and counters have to be used for the determination of period durations. A further advantage is that no special operating mode is required for the degradation; i.e., the information is obtained in normal measurement operation for each transmit-receive cycle. As a result, no additional latencies arise.

Further aspects and advantages of the present invention are now explained in more detail on the basis of the accompanying drawings.

DETAILED DESCRIPTION

Figure 1:
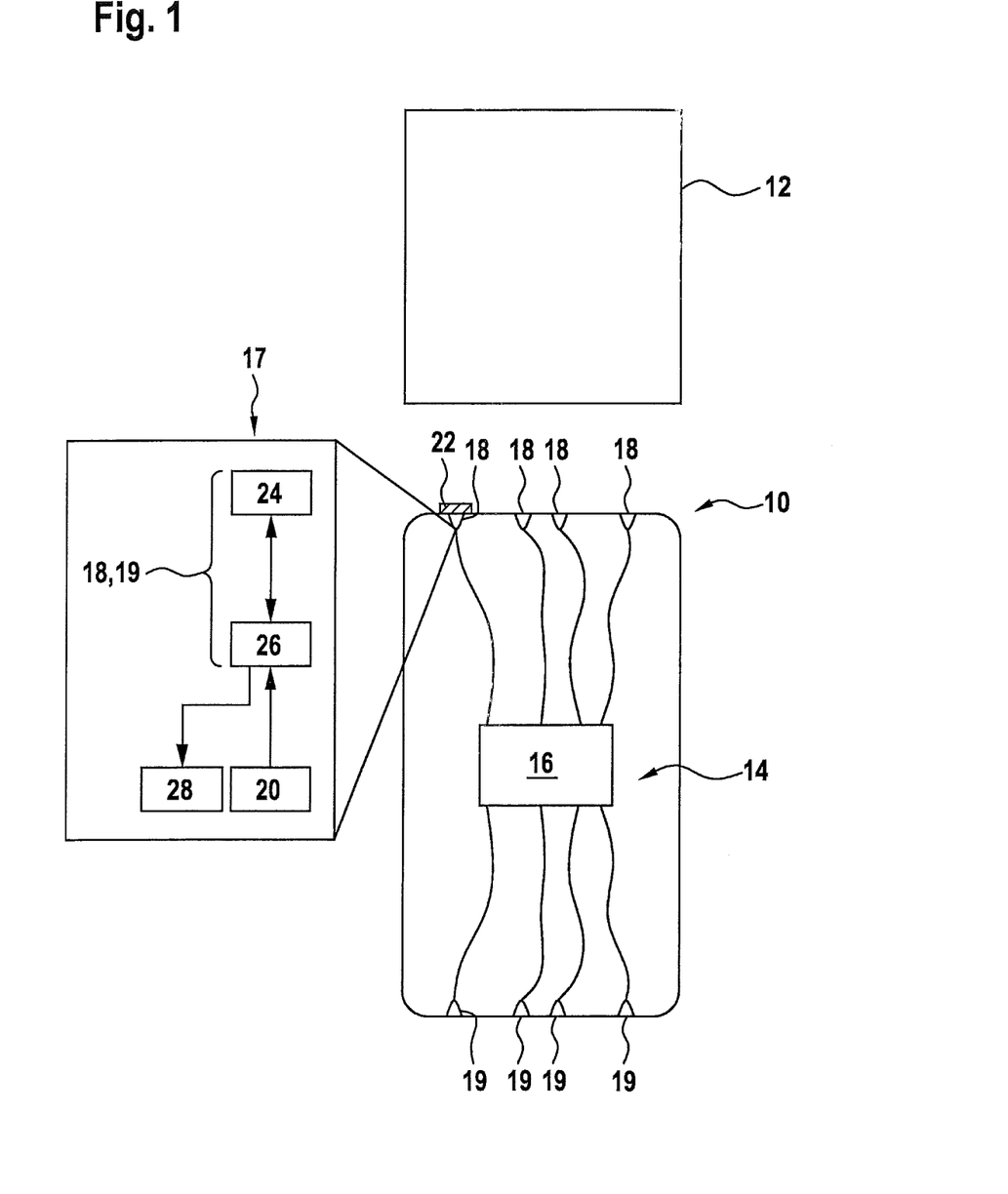
FIG. 1 shows a vehicle equipped with an ultrasound sensor according to the present invention, in a sample driving situation.

FIG. 1 schematically shows a driving situation with a vehicle 10 that for example is moving into a garage entrance or a bounded parking space 12.

Vehicle 10 is equipped with a driver assistance system 14 that includes an ultrasound-based sensor system for monitoring the surrounding environment, having ultrasound sensors 18, 19 at the front and at the rear on vehicle 10. Ultrasound-based sensor system 18 is controlled by separate devices 20 assigned to ultrasound sensors 18, 19, and by a higher-order unit 16, which is typically a central control device of driver assistance system 12. In addition to ultrasound sensors 18, 19 shown as examples in FIG. 1, other distance sensors, such as lidar infrared or radar sensors, can also be used for the runtime measurement.

In the enlarged segment of FIG. 1, the configuration of an ultrasound unit 17 having a pulse generator 20 and a receive unit 28 is shown. Here, typically a piezoactuator 26, which is connected to membrane 24 of ultrasound sensor 18, 19, is controlled by pulse generator 20 in order to send out pulses. In addition, piezoactuator 26 is connected to a receive unit 28 in order for example to receive an echo signal or to detect a decay characteristic of membrane 24. The signal processing here takes place in sensor-individual units 28 or in central electronics unit 16, partial steps of the signal processing taking place in one of units 16, 28, or in distributed fashion at units 16, 28.

When vehicle 10 approaches the bounded parking space or garage entrance 12, front ultrasound sensors 18 send out ultrasound pulses in order to determine the distance between vehicle 10 and boundaries 12 from the runtime of the ultrasound pulses. Here, as is shown schematically in FIG. 1, a situation can occur in which for example an ultrasound sensor 18, and in particular membrane 24 of the ultrasound sensor, is covered with snow or mud 22, and as a result is limited in its functional capacity, or is even completely nonfunctional. Ultrasound sensor 18 and driver assistance system 14 are here, in the worst case, blind to obstacles 12, which can lead to dangerous driving situations.

In such situations, it is therefore essential to generate a reliable assessment of the functional capacity of ultrasound sensor 18, so that driver assistance system 14 can react in a corresponding manner.

Figure 2:
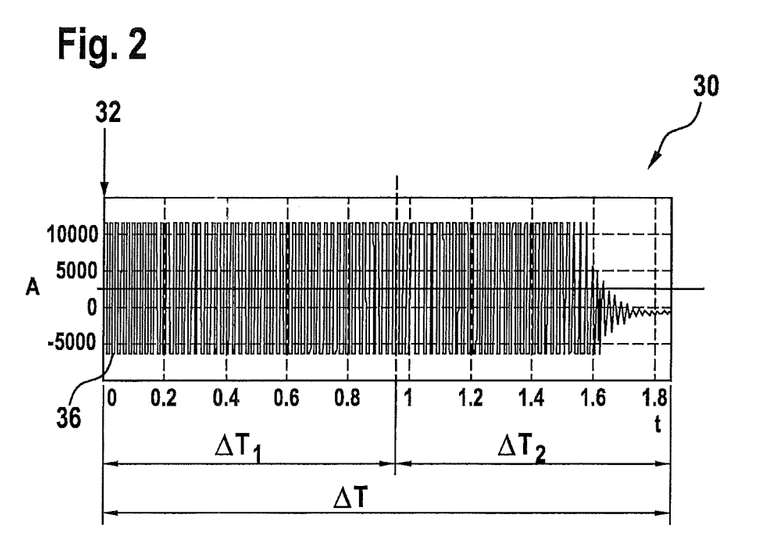
FIG. 2 schematically shows a signal curve of the sensor signal for a measurement cycle in the transmit and decay interval.

FIG. 2 schematically shows a sample curve of sensor signal 30, signal amplitude A measured by an ultrasound sensor 18, 19 being plotted over time t for a measurement cycle $\Delta T$.

Measurement cycle $\Delta T$ begins with transmit pulse 32 for a transmit pulse length $\Delta T_1$, and ends after decay interval $\Delta T_2$. Transmit pulse 32 excites at least one ultrasound sensor 18, 19 to send an ultrasound pulse for a specified time period $\Delta T_1$. During decay duration $\Delta T_2$, membrane 24 of ultrasound sensor 18, 19 post-oscillates for approximately 0.7 to 0.9 ms, and the reception of echo signals is possible only to a limited extent. After decay duration $\Delta T_2$, the ultrasound sensor is ready to receive for a receive interval (not shown), the receive interval being a function of the desired range, for example 5 m. In this time window, ultrasound sensor 18, 19 can receive echo signals reflected by objects 12.

Here it is to be noted that possible saturations in signal curves 30 shown here originate from the amplifier stage used to carry out the trials. However, amplifier stages have long been familiar to those skilled in the art, so that the amplifier stage can easily be adapted according to the application.

Figure 3:
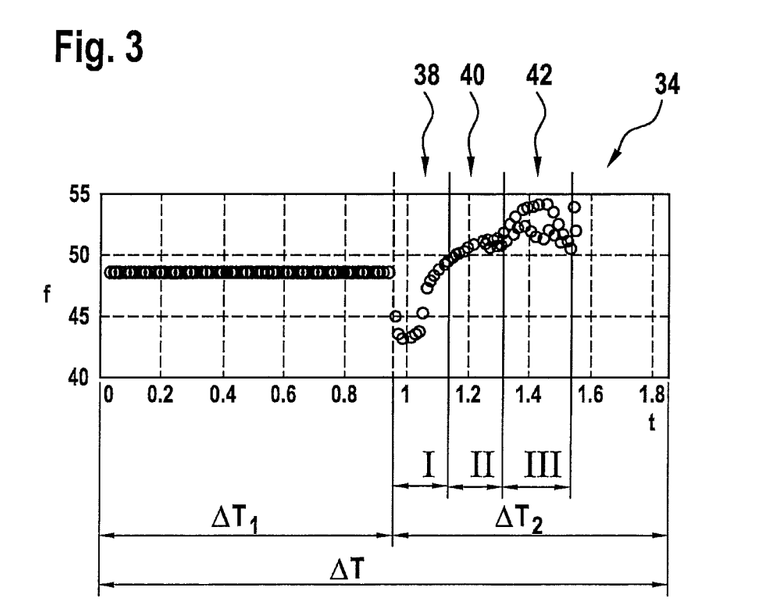
FIG. 3 schematically shows a frequency response of the sensor signal from FIG. 2 for a measurement cycle in the transmit and decay interval.

FIG. 3 schematically shows a frequency response 34 of the sensor signal from FIG. 2 for a measurement cycle $\Delta T$.

Frequency response 34 of the sensor signal from FIG. 2 results from half the wavelength 36 of the sensor signal. For this purpose, for each interval 36 of a half wavelength the frequency is determined and is plotted against a center time point t. During transmit pulse length $\Delta T_1$, frequency response 34 is determined by the electronic control unit of ultrasound sensor 18, 19. For example, a transmit pulse 38 can be sent out having a pulse length $\Delta T_1$ of approximately 1 ms and having a frequency of approximately 48 kHz.

Measurement cycle $\Delta T_1$ ends after decay interval $\Delta T_2$, which results from a post-oscillation or dying out of membrane 24 of ultrasound sensor 18, 19. In decay interval $\Delta T_2$, in the example shown here there are contained three subintervals I, II, III. First, in subinterval I there occurs a minimum 38 that is followed by a rising passage 40 in subinterval II. In subinterval III, minima and maxima 42 are newly formed.

Frequency response 34 in subinterval II characterizes the inherent frequency of ultrasound sensor 18, 19. In order to determine the inherent frequency, the frequencies in this subinterval II are averaged. In contrast, frequency response 34 in subintervals I and II characterizes mechanical and electronic properties of ultrasound sensor 18, 19.

Figure 4:
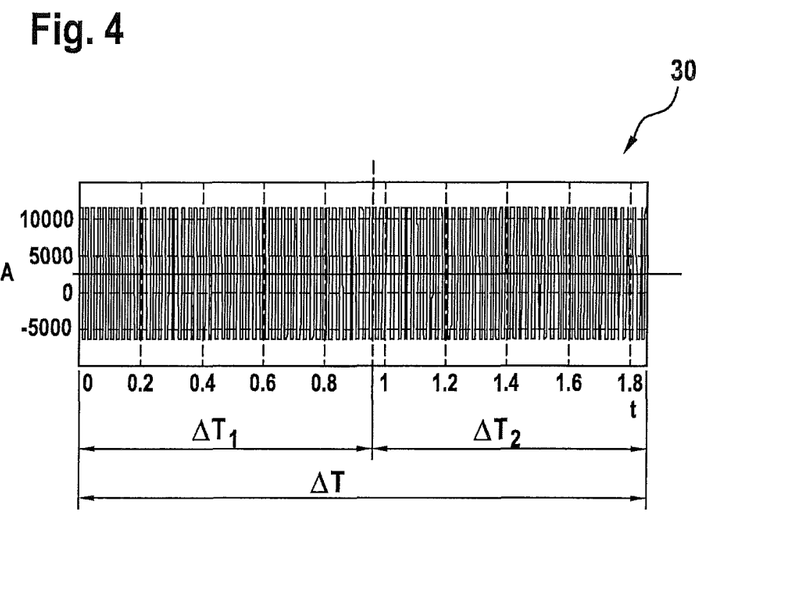
FIG. 4 schematically shows a further signal curve of the sensor signal for a measurement cycle in the transmit and decay interval.
Figure 6:
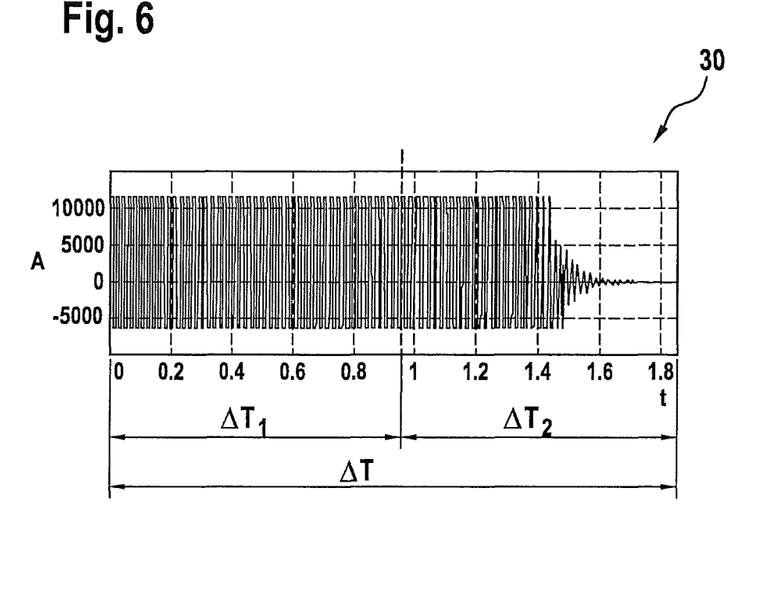
FIG. 6 schematically shows a further signal curve of the sensor signal for a measurement cycle in the transmit and decay interval.

FIGS. 4 and 6 schematically show further signal curves 30 of the sensor signal for a measurement cycle $\Delta T_1$ for distance measurement.

In comparison to signal curves 30 shown in FIG. 2, signal curves 30 of FIGS. 4 and 6 originate from an ultrasound sensor 18, 19 whose membrane 24 was covered with various quantities of mud and ice 22 during the measurement. In the example shown in FIG. 4, 50 mg of mud 22 are found on membrane 24. In the example of FIG. 6, 100 mg of mud 22 are found on membrane 24.

From the signal curves of FIGS. 4 and 6, decay time $T_2$ results from the length of decay interval $\Delta T_2$. Here, decay time $T_2$ of signal curve 30 from FIG. 4 is greater than decay time $T_2$ of signal curves 30 from FIGS. 2 and 6. In addition, decay time $T_2$ of signal curve 30 of FIG. 6 is smaller than decay time $T_2$ of signal curve 30 shown in FIG. 2. From this, it can be seen that decay time $T_2$ is not correlated with the degree of degradation of ultrasound sensor 18, 19. Thus, decay time $T_2$ does not give any indication as to whether ultrasound sensor 18, 19 is partially or completely blind. Here, the method according to the present invention can provide help.

Figure 5:
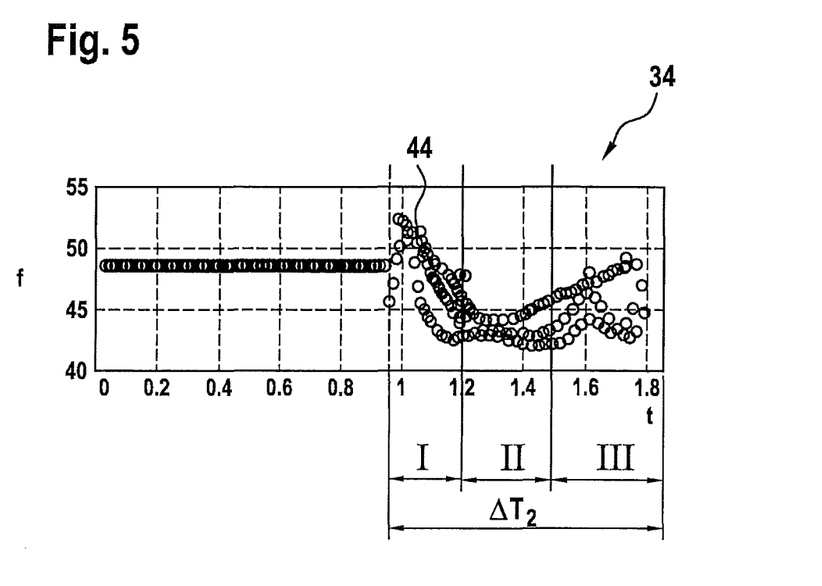
FIG. 5 schematically shows a further frequency response of the sensor signal from FIG. 4 for a measurement cycle in the transmit and decay interval.
Figure 7:
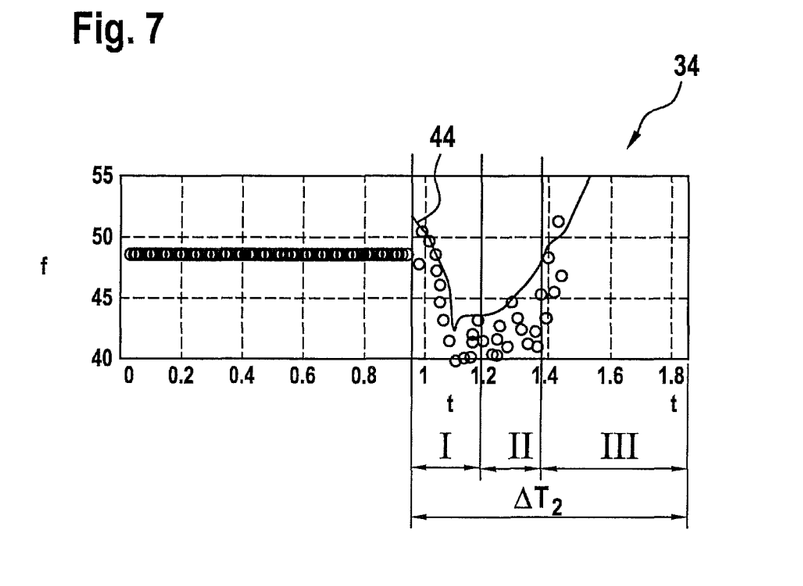
FIG. 7 schematically shows a further frequency response of the sensor signal from FIG. 6 for a measurement cycle in the transmit and decay interval.

FIGS. 5 and 7 schematically show the corresponding frequency response 34, which results, as described above, from signal curves 30 of FIGS. 4 and 6.

A comparison of frequency response 34 in the examples shown in FIGS. 3, 5, and 7 shows that frequency response 34 in decay interval $\Delta T_2$ changes according to the degree of degradation. In particular in subinterval II, which is decisive for the inherent frequency of ultrasound sensor 18, 19, the degree of degradation can be seen clearly. Thus, a determination of the inherent frequency by averaging the frequencies in subinterval II yields, in the example of FIG. 3 with a fully functional ultrasound sensor 18, 19, a higher inherent frequency than in the examples of FIGS. 5 and 7. In the example of FIG. 5, the average frequency in subinterval II is smaller than in the example of FIG. 3, and is larger than in the example of FIG. 7. Thus, ultrasound sensor 18, 19 is partially blind, and the degree of degradation is greater than in the case of the fully functional ultrasound sensor 18, 19 of FIG. 3. The example of FIG. 7 shows a still greater degree of degradation, with an ultrasound sensor that is quasi-blind.

In this way, the degree of degradation is determined from the inherent frequency in subinterval II of decay interval $\Delta T_2$. In order to indicate a concrete value for the degree of degradation of ultrasound sensor 18, 19, the determined inherent frequency is compared to a stored target value that may correspond to the inherent frequency of fully functional ultrasound sensor 18, 19, and the difference is formed. If the difference is <1-2 kHz, the sensor is fully functional. If the difference is greater, the sensor is partially blind, and if the difference is greater than 5-8 kHz then the sensor is no longer functioning.

In addition to the inherent frequency as a measure for the degree of degradation, the envelope 44 of frequency response 34 can also make it possible to infer the degree of degradation, as can be seen in FIGS. 3, 5, and 7. Thus, envelope 44 of frequency response 34 of a fully functional ultrasound sensor 18, 19 differs from that of a blind or partially blind ultrasound sensor 18, 19. In particular, extremum 34 in subinterval I shows a change from the minimum for fully functional ultrasound sensor 18, 19 to the maximum for the blind or partially blind ultrasound sensor 18, 19.

Envelope 44 of frequency response 34 in subintervals II, III also changes in particular with regard to the frequency level. In addition to the changes in envelope 44 of frequency response 34 in decay interval $\Delta T_2$, the changes in transmit interval $\Delta T_1$ can also be used to determine the degree of degradation. The envelope of the frequency response can be determined for this purpose, and can be compared to a "normal" curve stored in the storage device of receiver device 28 of the sensor, i.e. can be compared to that of a fully functional distance sensor. The difference can be determined and characterized using standard methods, for example by determining the mean deviation.

Due to the simplicity of the method, the method can also be realized as hardware circuitry in the receive device allocated to the distance sensor, or can be realized in software.

Figure 8:
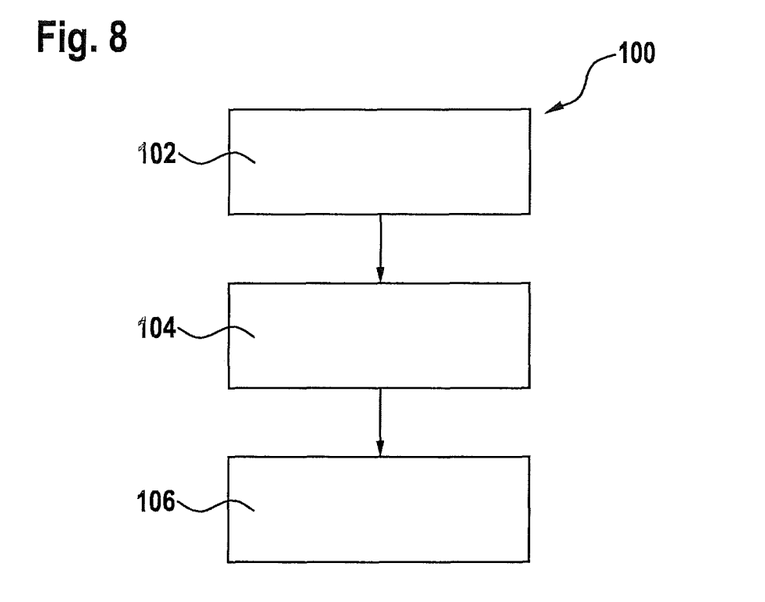
FIG. 8 shows, in the form of a flow diagram, a manner of operation of the ultrasound sensor according to the present invention from FIG. 1.

FIG. 8 shows a manner of operation of the driver assistance system from FIG. 1, in the form of a flow diagram 100.

In a first step 102, at least one ultrasound pulse having a determined pulse length is sent out. In a second step 104, the sensor signal is acquired in decay interval $\Delta T_2$ or in transmit interval $\Delta T_1$ and decay interval $\Delta T_2$. In a third step 106, the degree of degradation is determined on the basis of envelope 44 of the acquired sensor signal. The determination of the degree of degradation can take place as described above, on the basis of the inherent frequency or envelope 44.

In addition, it can be provided that echo signals are recognized in decay interval $\Delta T_2$ based on a decay time, in order to avoid misclassifications of an ultrasound sensor 18, 19 in the context of the determination of the degree of degradation. For this purpose, transmit pulse length $T_1$ can be selected to be longer than decay time $T_2$, or a change in the echo signal can be used as a basis, for example in the case of moving vehicles 10. If in both variants the decay time remains equal, then ultrasound sensor 18, 19 is blind.

The present invention is not limited to the exemplary embodiments described herein and the aspects thereof that are highlighted. Rather, within the scope indicated by the attached claims, a large number of modifications are possible that lie within the standard practice of those skilled in the art.

What is claimed is:

1. A method for detecting a sensor degradation in distance sensors, the method comprising:
   a) sending out at least one transmit pulse;
   b) acquiring a sensor signal in at least one decay interval; and
   c) determining a degree of degradation based on a frequency response of the acquired sensor signal,
   wherein the degree of degradation is validated, in an additional task d), through a variation of the transmit pulse length.

2. The method of claim 1, wherein the sensor signal is acquired in each decay interval that follows a transmit interval.

3. The method of claim 1, wherein the frequency response of the acquired sensor signal is determined from intervals of at least a quarter wavelength.

4. The method of claim 1, wherein the frequency response of the acquired sensor signal includes at least three intervals, a first and a third interval containing at least one extremum, and a second interval being situated between a last extremum of the first interval and a first extremum of the third interval.

5. The method of claim 4, wherein the degree of degradation is determined based on the frequency response in the second interval.

6. A method for detecting a sensor degradation in distance sensors, the method comprising:
   a) sending out at least one transmit pulse;
   b) acquiring a sensor signal in at least one decay interval; and
   c) determining a degree of degradation based on a frequency response of the acquired sensor signal,
   wherein the frequency response of the acquired sensor signal includes at least three intervals, a first and a third interval containing at least one extremum, and a second interval being situated between a last extremum of the first interval and a first extremum of the third interval,
   wherein a mean value is determined from the frequency response in the second interval, and the degree of degradation is determined from the mean value and a specified target value.

7. The method of claim 1, wherein the sensor signal is acquired in a decay interval and in a transmit interval.

8. The method of claim 1, wherein the degree of degradation results from the envelope of the frequency response.

9. The method of claim 1, wherein the degree of degradation is validated, in an additional task d), through a variation of the transmit pulse length.

10. The method of claim 1, wherein echo signals in the decay interval are recognized based on a decay time.

11. A non-transitory computer readable medium having a computer program, which is executable by a processor, comprising:
    a program code arrangement having program code for detecting a sensor degradation in distance sensors, by performing the following:
    a) sending out at least one transmit pulse;
    b) acquiring a sensor signal in at least one decay interval; and
    c) determining a degree of degradation based on a frequency response of the acquired sensor signal,
    wherein the degree of degradation is validated, in an additional task d), through a variation of the transmit pulse length.

12. A distance sensor unit, comprising:
    a receive unit for detecting a sensor degradation in distance sensors, and which is configured to perform the following:
    a) sending out at least one transmit pulse;
    b) acquiring a sensor signal in at least one decay interval; and
    c) determining a degree of degradation based on a frequency response of the acquired sensor signal,
    wherein the degree of degradation is validated, in an additional task d), through a variation of the transmit pulse length.

13. A driver assistance system for detecting a sensor degradation in distance sensors, comprising:
    at least one distance sensor for sending out at least one transmit pulse;
    at least one acquiring component for acquiring a sensor signal in at least one decay interval; and
    at least one determining component for determining a degree of degradation based on a frequency response of the acquired sensor signal,
    wherein the degree of degradation is validated, in an additional task d), through a variation of the transmit pulse length.

* * * * *